(12) United States Patent
Wei et al.

(10) Patent No.: US 11,265,915 B2
(45) Date of Patent: *Mar. 1, 2022

(54) METHODS AND DEVICES FOR ADAPTIVE SCHEDULING REQUEST PROCEDURE

(71) Applicant: FG Innovation Company Limited, Tuen Mun (HK)

(72) Inventors: Chia-Hung Wei, Hsinchu (TW); Heng-Li Chin, Taipei (TW); Chie-Ming Chou, Hsinchu (TW); Hung-Chen Chen, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 16/903,199

(22) Filed: Jun. 16, 2020

(65) Prior Publication Data

US 2020/0314894 A1 Oct. 1, 2020

Related U.S. Application Data

(63) Continuation of application No. 16/197,394, filed on Nov. 21, 2018, now Pat. No. 10,736,137.

(60) Provisional application No. 62/590,383, filed on Nov. 24, 2017.

(51) Int. Cl.
| | | |
|---|---|---|
| *H04W 74/02* | (2009.01) | |
| *H04W 72/12* | (2009.01) | |
| *H04W 72/04* | (2009.01) | |
| *H04W 72/10* | (2009.01) | |
| *H04W 28/02* | (2009.01) | |
| *H04W 74/08* | (2009.01) | |
| *H04W 80/02* | (2009.01) | |

(52) U.S. Cl.
CPC ....... *H04W 74/02* (2013.01); *H04W 72/0413* (2013.01); *H04W 72/10* (2013.01); *H04W 72/12* (2013.01); *H04W 72/1242* (2013.01); *H04W 28/0278* (2013.01); *H04W 74/0833* (2013.01); *H04W 80/02* (2013.01)

(58) Field of Classification Search
CPC ............. H04W 74/02; H04W 74/0833; H04W 72/0413; H04W 72/10; H04W 72/1242; H04W 28/0278; H04W 80/02
See application file for complete search history.

(56) References Cited

U.S. PATENT DOCUMENTS

| | | | | |
|---|---|---|---|---|
| 2012/0069805 | A1* | 3/2012 | Feuersanger | H04W 72/0413 370/329 |
| 2015/0312371 | A1* | 10/2015 | Han | H04W 4/70 370/281 |
| 2018/0199343 | A1* | 7/2018 | Deogun | H04L 5/0044 |

OTHER PUBLICATIONS

Nokia et al., "SR procedure for NR", R2-1710817, 3GPP TSG-RAN WG2 #99bis Prague, Czech Republic, Oct. 9-13, 2017.

(Continued)

*Primary Examiner* — Wei Zhao
(74) *Attorney, Agent, or Firm* — ScienBiziP, P.C.

(57) ABSTRACT

A method performed by a User Equipment (UE) includes a Medium Access Control (MAC) entity triggering a first Scheduling Request (SR) procedure for a first logical channel, triggering a second SR procedure for a second logical channel, and in response to triggering the first SR procedure, initiating a Random Access (RA) procedure and canceling the first SR procedure without cancelling the second SR procedure.

6 Claims, 6 Drawing Sheets

(56) References Cited

OTHER PUBLICATIONS

Huawei et al., "Remaining issues on SR Configuration", R2-1710108, 3GPP TSG-RAN2 Meeting #99bis Prague, Czech Republic, Oct. 9-13, 2017.
Mediatek Inc., "SRS design in NR", R1-1710817, 3GPP TSG RAN WG1 NR Ad-Hoc#2 Qingdao, P.R. China Jun. 27-30, 2017.
Huawei et al., "SR triggering and Cancellation", R2-1706986, 3GPP TSG-RAN WG2 NR Ad Hoc Qingdao, China, Jun. 27-29, 2017.
Huawei et al., "UE behaviour with none SR Configuration", R2-1708267, 3GPP TSG-RAN2 Meeting #99 Berlin, Germany, Aug. 21-25, 2017.
ITRI, "Discussion on SR Procedure", R2-1711765, 3GPP TSG-RAN WG2 Meeting #99bis Prague, Czech Republic, Oct. 9-13, 2017.
"3rd Generation Partnership Project; Technical Specification Group Radio Access Network; NR; Medium Access Control (MAC) protocol specification (Release 15)", 3GPP TS 38.321 V1.1.0 (Nov. 2017).
Huawei et al., "SR enhancements with multiple Numerologies", R2-1705625, 3GPP TSG-RAN2 Meeting #98 Hangzhou, China, May 15-19, 2017.

* cited by examiner

Option 1

Option 2

METHODS AND DEVICES FOR ADAPTIVE SCHEDULING REQUEST PROCEDURE

CROSS-REFERENCE TO RELATED APPLICATION(S)

This application is a continuation application of U.S. patent application Ser. No. 16/197,394 filed on Nov. 21, 2018, which claims the benefit of and priority to provisional U.S. Patent Application Ser. No. 62/590,383 filed on Nov. 24, 2017. The contents of all above-named applications are fully incorporated herein by reference for all purposes.

FIELD

The present disclosure generally relates to wireless communication, and more particularly, to methods and devices for an adaptive Scheduling Request (SR) procedure.

BACKGROUND

In a Long Term Evolution (LTE) wireless communication system, a User Equipment (UE) may trigger a Scheduling Request (SR) procedure to request the network to allocate uplink radio resources for transmission when certain SR triggering condition(s) is satisfied. For example, if the UE has no uplink radio resources for transmitting the Buffer Status Report (BSR) Medium Access Control (MAC) Control Element (CE), or does not receive a positive feedback (e.g., allocation of uplink radio resources for transmission) of the BSR from the base station, the UE may trigger the SR procedure. Furthermore, once the SR procedure has failed, a Random Access (RA) procedure will be triggered, such that the pending SR procedure is cancelled.

For the next generation (e.g., 5G New Radio (NR)) wireless communication technology, the UE's Medium Access Control (MAC) entity can be configured with zero, one, or more than one SR configuration by a base station (e.g., next generation NodeB (gNB)). Each SR configuration may correspond to one or more Logical Channels (LCHs), and each LCH may be mapped to zero or one SR configuration. If a UE triggers an SR procedure for an LCH configured with an SR configuration, the UE may use the SR configuration to perform the SR procedure, which includes the SR transmission via the uplink radio resource indicated by the SR configuration. That is, the SR configuration of the LCH that triggers the BSR may be considered as the corresponding SR configuration for the triggered SR procedure. However, the SR operation for the LCH with zero SR configuration is still an open issue.

Thus, there is a need in the art for an adaptive SR procedure for LCH(s) configured with zero SR configuration in the next generation wireless communication system.

SUMMARY

The present disclosure is directed to methods and devices for an adaptive SR procedure.

In an aspect of the present disclosure, a method performed by a UE is provided. The method includes a MAC entity triggering a first SR procedure for a first logical channel, triggering a second SR procedure for a second logical channel, and in response to triggering the first SR procedure, the MAC entity initiating an RA procedure and canceling the first SR procedure without cancelling the second SR procedure.

In another aspect of the present disclosure, a UE is provided. The UE includes one or more non-transitory computer-readable media having computer-executable instructions embodied thereon and at least one processor coupled to the one or more non-transitory computer-readable media. The at least one processor is configured to execute the computer-executable instructions to trigger a first SR procedure for a first logical channel, trigger a second SR procedure for a second logical channel, and in response to triggering the first SR procedure, initiate an RA procedure and cancel the first SR procedure without cancelling the second SR procedure.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
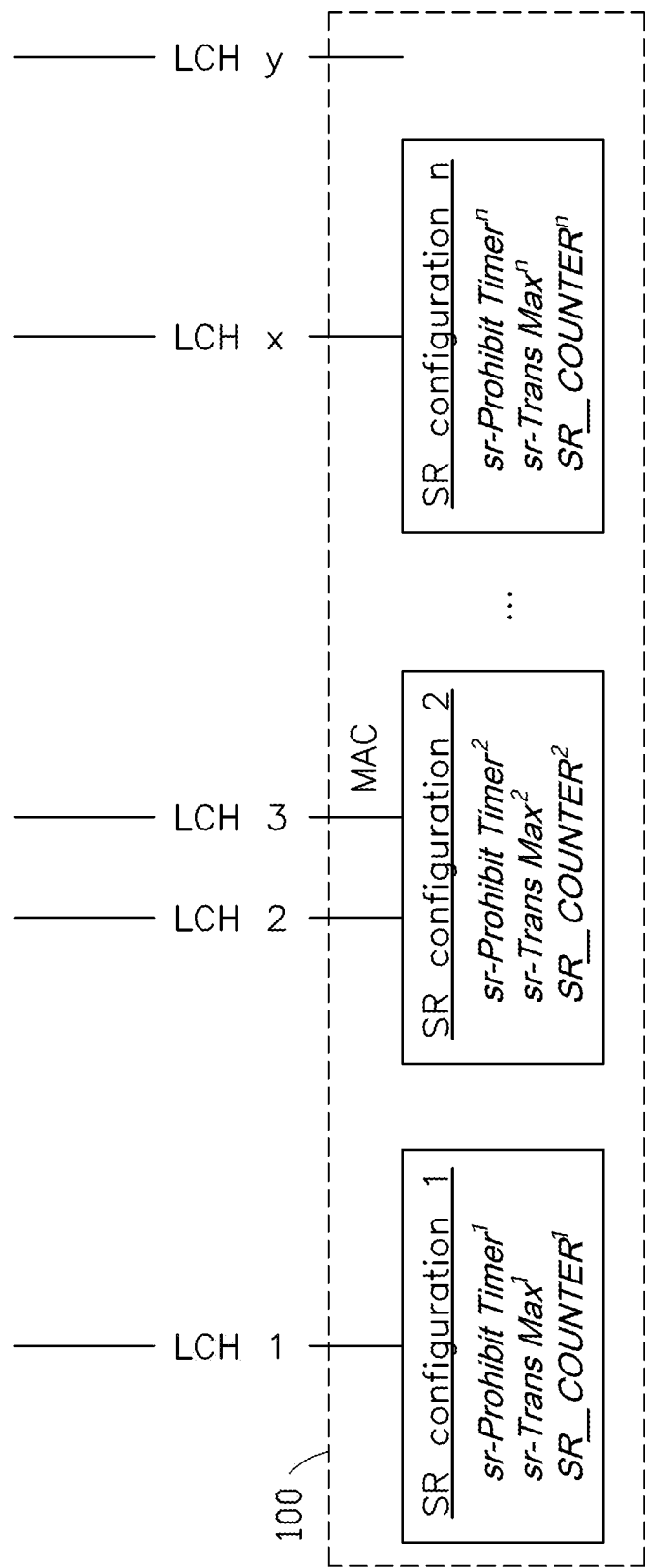
FIG. 1 shows a schematic diagram of an SR configuration mapping, in accordance with an implementation of the present disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

A computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, a LTE-Advanced (LTE-A) system, or a LTE-Advanced Pro system) typically includes at least one base station, at least one UE, and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), or an internet), through a radio access network (RAN) established by the base station.

A UE may include, but is not limited to, a mobile station, a mobile terminal or device, a user communication radio terminal, etc. For example, a UE may be a portable radio equipment, which includes, but is not limited to, a mobile phone, a tablet, a wearable device, a sensor, or a personal digital assistant (PDA) with wireless communication capability. The UE is configured to receive/transmit signals over an air interface from/to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, an NG-eNB as in an E-UTRA base station in connection with the 5GC, a next generation node B (gNB) as in the 5G-AN, and any other apparatus capable of controlling radio communication and managing radio resources within a cell. The base station may connect to serve the one or more UEs through a radio interface to the network.

The base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra-reliable communication and low latency communication (URLLC), while fulfilling high reliability, high data rate and low latency requirements. The orthogonal frequency-division multiplexing (OFDM) technology as agreed in 3GPP may serve as a baseline for a NR waveform. The scalable OFDM numerology, such as the adaptive sub-carrier spacing, the channel bandwidth, and the Cyclic Prefix (CP), may also be used. Additionally, two coding schemes are considered for NR: (1) low-density parity-check (LDPC) code and (2) Polar Code. The coding scheme adaption may be configured based on the channel conditions and/or the service applications.

Moreover, it should be noted that in a transmission time interval (TTI) of a single NR frame, at least downlink (DL) transmission data, a guard period, and uplink (UL) transmission data should be included. Additionally, the respective portions of the DL transmission data, the guard period, and the UL transmission data should also be configurable, for example, based on the network dynamics of NR. In addition, sidelink resource may also be provided in an NR frame to support ProSe services.

In various implementations of the present disclosure, the UE's MAC entity may be configured with zero, one, or more SR configurations by the base station. An SR configuration may include a set of Physical Uplink Control Channel (PUCCH) resources for SR transmission in different Bandwidth Parts (BWPs) and/or cells. The set of PUCCH resources for SR transmission may be allocated in one or more BWPs and/or cells. For an LCH, at most one PUCCH resource for SR may be configured per BWP. Each SR configuration may correspond to one or more logical channels (LCHs). Each LCH may be mapped to zero or one SR configuration. Such mapping may be configured by the base station (e.g., gNB) through the Radio Resource Control (RRC) layer.

FIG. 1 shows a schematic diagram of an SR configuration mapping, in accordance with an implementation of the present disclosure. As shown in FIG. 1, a MAC entity 100 of UE is configured with n SR configurations. Each SR configuration may include at least one SR-related parameter such as an SR prohibit timer (e.g., sr-ProhibitTimer), a maximum number of SR transmission (e.g., sr-TransMax) applied by the UE within an SR procedure, and/or an SR transmission counter (e.g., SR_COUNTER).

More than one LCH may be configured with the same SR configuration. As shown in FIG. 1, the SR configuration 2 (sr-ProhibitTimer$^2$, sr-TransMax$^2$ and SR_COUNTER$^2$) are shared between LCH 2 and the LCH 3 since these two LCHs are mapped to the same SR configuration (i.e., SR configuration 2). LCH x is mapped to SR configuration n. It should be noted that the LCH y is mapped to zero SR configuration, which means that LCH y may not be configured with any PUCCH resource for SR transmission and/or SR-related parameter by the base station (e.g., gNB).

In some implementations, the LCHs within a MAC entity may be assigned priority indices and grouped into one or more Logical Channel Groups (LCGs).

Figure 2:
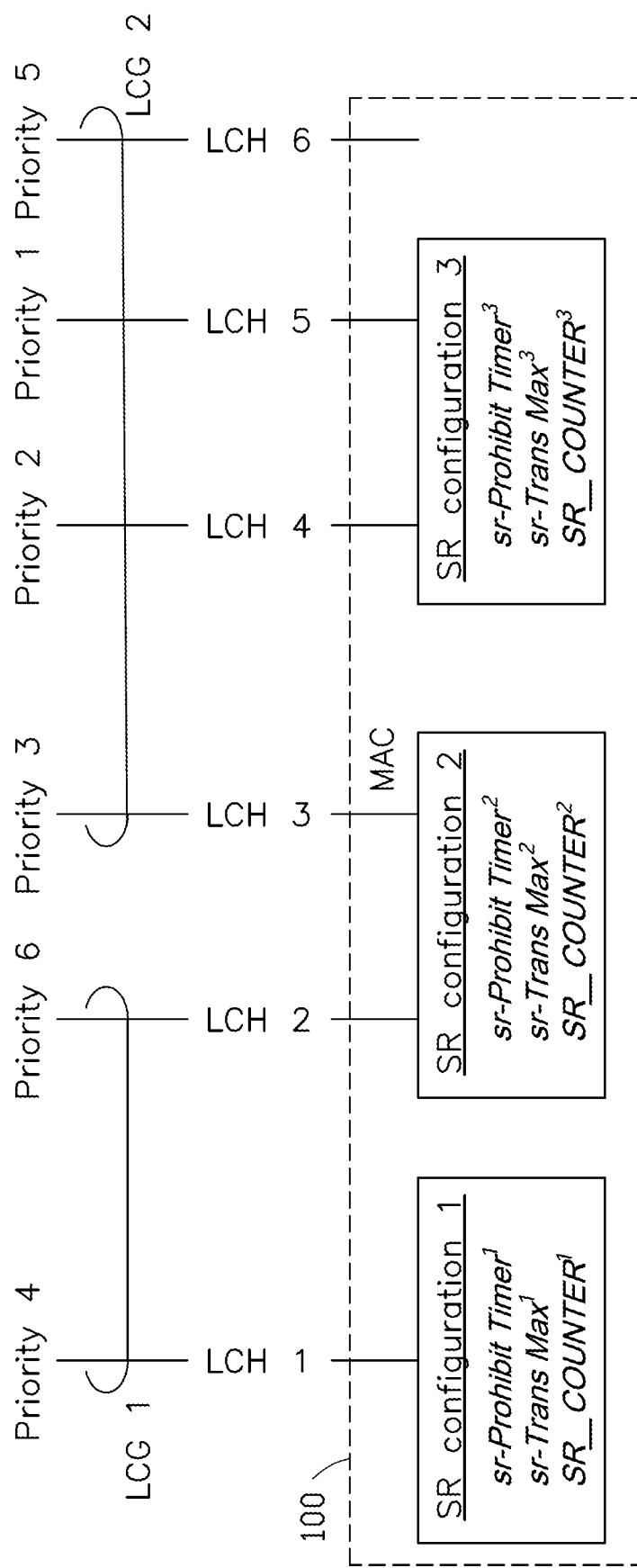
FIG. 2 shows a schematic diagram of the SR configuration mapping with MAC entities assigned priority indices, in accordance with an implementation of the present disclosure.

As shown in FIG. 2, the UE's MAC entity 100 includes multiple LCHs 1 to 6, which are assigned by priority indices of 4, 6, 3, 2, 1 and 5, respectively. The LCH 1 is configured with the SR configuration 1. The LCHs 2 and 3 are configured with the SR configuration 2. The LCHs 4 and 5 are configured with the SR configuration 3. The LCH 6 is configured with zero configuration because it is not configured with any SR configuration.

Also as shown in FIG. 2, the LCH 1 and the LCH 2 are grouped into the LCG 1, and the LCHs 3 to 6 are grouped into the LCG 2. In the example of FIG. 2, an LCH with a lower priority index may have a higher priority. For example, the priority of the LCH 3 is higher than that of the LCH 2 because the LCH 3 has a smaller priority index (e.g., 3) than that of the LCH 2 (e.g., 6). It is understood that the present disclosure is not limited thereto. In other implementations, an LCH with a smaller priority index may have a lower priority.

Figure 3A:
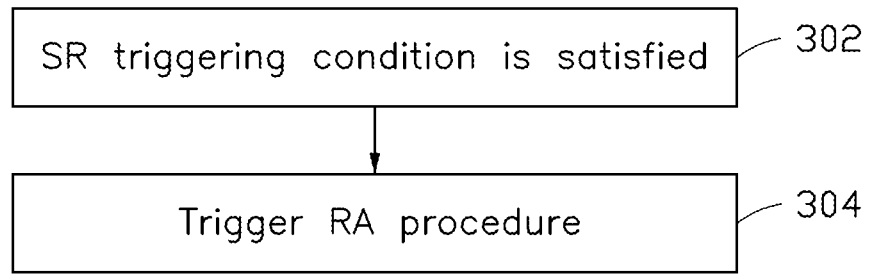
FIG. 3A is a flowchart of a first option wherein an SR triggering condition is satisfied.
Figure 3B:
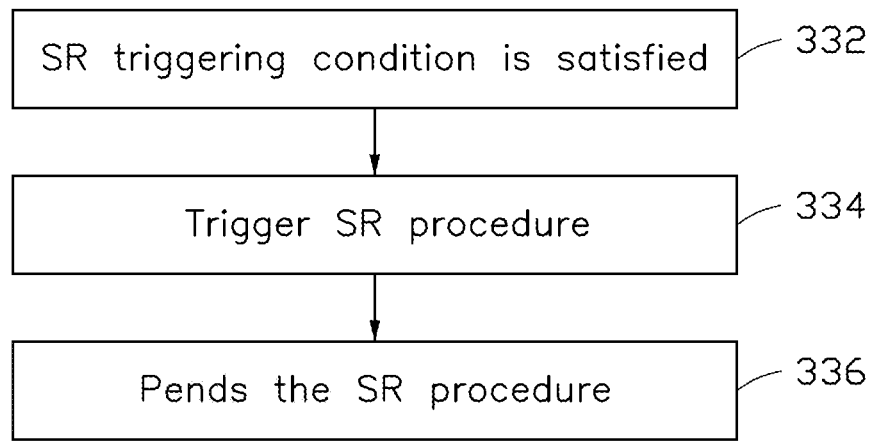
FIG. 3B is a flowchart of a second option wherein an SR triggering condition is satisfied.

Referring to FIGS. 3A and 3B, a UE's MAC entity may need to handle situations wherein a zero SR configuration LCH satisfies certain SR triggering condition(s). One of the options (e.g., Option 1 shown in FIG. 3A) is to trigger the RA procedure directly once the SR triggering condition is satisfied. Another option (e.g., Option 2 shown in FIG. 3B) is to trigger the SR procedure when the SR triggering condition is satisfied, and keep the triggered SR procedure pending until it is cancelled.

As shown in FIG. 3A, the procedure of Option 1 includes actions 302 and 304. In action 302, the SR triggering condition is satisfied. The SR triggering condition may be, for example, the UE failing to acquire uplink radio resources for transmitting the BSR, or the UE not receiving any positive feedback (e.g., an allocation of uplink radio resources for transmission) of the BSR from the base station. In action 304, the UE triggers an RA procedure.

Option 1 is based on the RA triggering mechanism introduced in the LTE system; that the RA procedure is triggered after the SR procedure has failed (e.g., the UE has transmitted the SR for sr-TransMax times and does not get any uplink radio resource from the base station for BSR transmission). The purpose of this mechanism is, after SR failure, to let the UE ask the base station for a grant of uplink radio resource through a Random Access Channel (RACH). However, it should be noted that once the RA procedure is triggered, the UE may release the PUCCH configuration, which means that other pending SR procedure(s) may also be cancelled.

Since the NR system is able to support multiple SR configurations within a single MAC entity and allow the MAC entity to perform more than one SR procedure simultaneously, if all pending SR procedures are canceled once an RA procedure is triggered, the system performance may be degraded. Furthermore, compared to other LCHs configured with the SR configuration, the zero SR configuration LCH may trigger the RA procedure much earlier by skipping the sr-TransMax SR transmissions in other SR configurations.

In FIG. 3B, the procedure of Option 2 includes actions 332, 334 and 336. In action 332, the SR triggering condition is satisfied. In action 334, the UE triggers the SR procedure. In action 336, the UE keeps the SR procedure pending until the SR procedure is cancelled. However, the base station may prohibit the SR procedure(s) triggered for certain LCH(s) through an LCH SR masking mechanism (e.g., logicalChannelSR-Mask). The base station may not be aware that the zero SR configuration LCH has triggered a SR, since the triggered SR is kept as pending throughout the process.

In various implementations of the present disclosure, an adaptive SR procedure is provided for any LCH(s) (e.g., the LCH y in FIG. 1) that are not configured with a valid PUCCH resource for SR transmission. In one implementation, the LCH that is not configured with a valid PUCCH resource for SR transmission may refer to an LCH configured with a zero SR configuration (zero SR configuration LCH). Specifically, since a base station may transmit an SR configuration to a UE via an RRC message (e.g., an RRC reconfiguration message) to indicate to the UE where the PUCCH resource for SR transmission is, if an LCH is configured with zero SR configuration, it also means that there is no valid PUCCH resource configured for the LCH. In another implementation, the LCH that is not configured with a valid PUCCH resource for SR transmission may refer to an LCH that is configured with a PUCCH resource, but the PUCCH resource is currently not in an active BWP.

In various implementations of the present disclosure, the UE's MAC entity may trigger a first SR procedure for a first LCH that is not configured with a valid PUCCH resource for the first SR procedure, and perform a plurality of procedures after triggering the first SR procedure. The procedures may include, for example, initiation of an RA procedure and cancelation of the first SR procedure.

Figure 4:
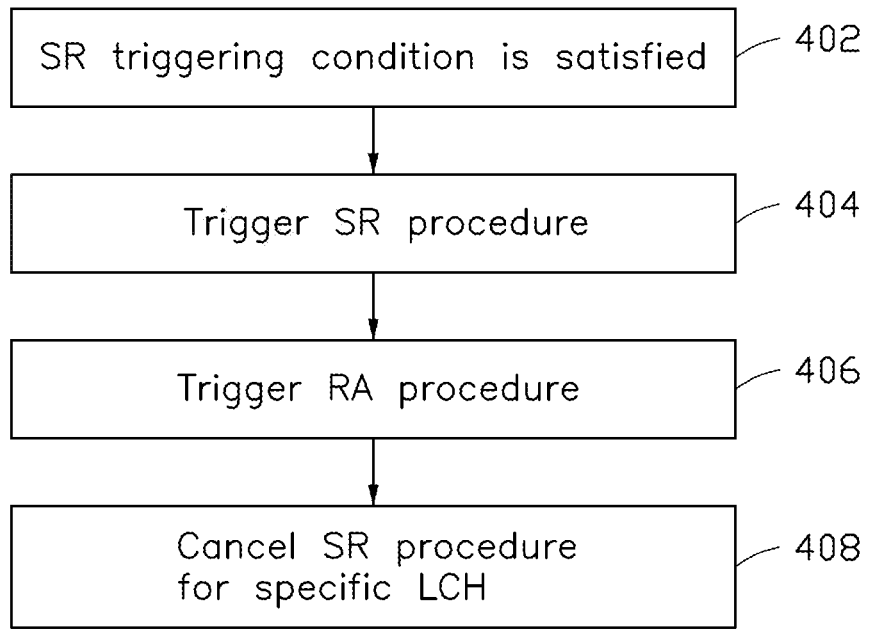
FIG. 4 is a flowchart of a method performed by a UE for SR operation, in accordance with an implementation of the present disclosure.

FIG. 4 is a flowchart of a method performed by a UE (e.g., by the UE's MAC entity) for SR operation, in accordance with an implementation of the present disclosure. In the illustrated implementation, once the UE detects that an LCH that is not configured with a valid PUCCH resource satisfies an SR triggering condition, the UE may trigger an SR procedure for the LCH, and then initiate an RA procedure and cancel selected SR procedure(s) triggered for specific LCH(s).

As shown in FIG. 4, the flowchart includes actions 402, 404, 406 and 408. In action 402, the UE may detect that a first LCH that is not configured with a valid PUCCH resource for SR transmission satisfies an SR triggering condition. In one implementation, the SR triggering condition may be that a buffer status reporting (BSR) procedure has failed, such as the UE failing to obtain uplink radio resources for transmitting a BSR MAC CE, or failing to receive a positive feedback (e.g., allocation of uplink radio resources for transmission) of the BSR from the base station.

In action 404, the UE may trigger (or initiate) a first SR procedure for the first LCH. Once the first SR procedure is triggered, the first SR procedure is considered as pending until it is cancelled. It should be noted that in the various implementations of the present disclosure, the time at which an SR procedure (e.g., the first SR procedure) is triggered may refer to the time that the SR procedure enters the pending state, and not the time that an SR is actually transmitted. In such a case, even though the first SR procedure is triggered for the first LCH, the UE may not transmit an SR for the first LCH because the first LCH is not configured with a valid PUCCH resource for the first SR procedure.

In action 406, the UE may trigger (or initiate) an RA procedure. For example, the RA procedure may be a 4-step procedure, which includes (1) uplink preamble transmission, (2) downlink Random Access Response (RAR) reception, (3) uplink RRC message transmission, and (4) downlink RRC message reception.

In action 408, the UE may cancel the pending SR procedure(s) triggered for specific LCH(s). According to various implementations of the present disclosure, the specific LCH(s) may be at least one of the following:

a) all of the LCH(s) within the same MAC entity (e.g., LCHs 1 to 6 in FIG. 2);
b) all of the LCH(s) within the same LCG (e.g., LCHs 3 to 6 in FIG. 2);
c) all of the LCH(s) having a lower priority than the zero SR configuration LCH (e.g., LCH 2 in FIG. 2);
d) all of the LCH(s) having a higher priority than the zero SR configuration LCH (e.g., LCH 1, 3, 4 and 5 in FIG. 2);
e) all of the LCH(s) that belong to an LCG containing at least one lower priority LCH than the zero SR configuration LCH (e.g., LCHs 1 and 2 in FIG. 2);
f) all of the LCH(s) that belong to an LCG containing at least one higher priority LCH than the zero SR configuration LCH (e.g., LCHs 1 to 5 in FIG. 2);
g) all of the LCH(s) that belong to an SR configuration containing at least one lower priority LCH than the zero SR configuration LCH (e.g., LCHs 2 and 3 in FIG. 2);
h) all of the LCH(s) that belong to an SR configuration containing at least one higher priority LCH than the zero SR configuration LCH (e.g., LCHs 1 to 5 of SR configurations 1, 2 and 3);
i) all of the LCH(s) having the same numerology mapping or requesting the same type of numerology uplink radio resource; and
j) the zero SR configuration LCH (e.g., LCH 6 in FIG. 2).

It should be noted that the zero SR configuration LCH described above can be replaced by an LCH (e.g., the first LCH) that is not configured with a valid PUCCH resource for the pending SR. For example, as shown in FIG. 3, the UE may initiate the RA procedure and cancel the first SR procedure triggered for the first LCH after triggering the first SR procedure.

Figure 5:
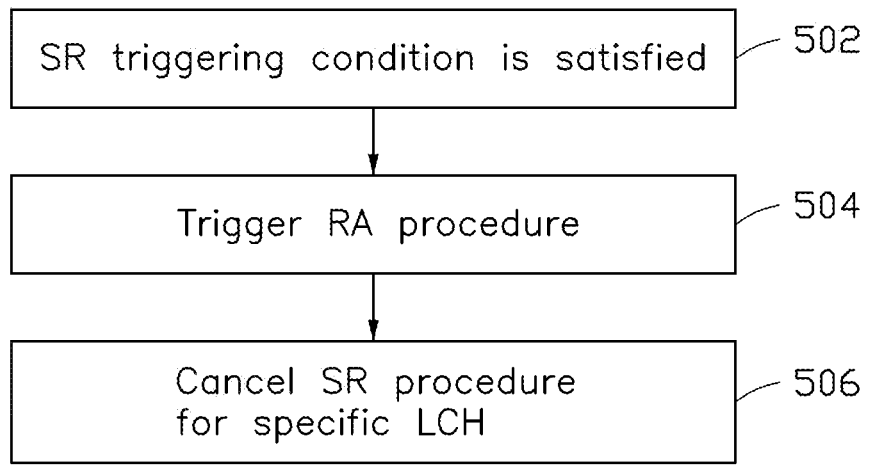
FIG. 5 is a flowchart of a method performed by a UE for SR operation, in accordance with an implementation of the present disclosure.

FIG. 5 is a flowchart of a method performed by a UE (e.g., by the UE's MAC entity) for SR operation, in accordance with an implementation of the present disclosure. In the illustrated implementation, once the UE detects that an LCH that is not configured with a valid PUCCH resource satisfies an SR triggering condition, the UE may trigger the RA procedure directly and cancel the pending SR procedure(s) triggered for specific LCH(s).

As shown in FIG. 5, the flowchart includes actions 502, 504 and 506. In action 502, the UE detects that a first LCH that is not configured with a valid PUCCH resource for SR transmission satisfies an SR triggering condition. For example, the SR triggering condition may be that a buffer status reporting (BSR) procedure has failed.

Then in action 504, the UE triggers an RA procedure directly. In action 506, the UE may cancel the pending SR procedure(s) triggered for specific LCH(s). Examples of the specific LCH(s) can be the same as that described in action 408 of FIG. 4.

In some implementations, while the base station (e.g., gNB) may configure an LCH without any SR configuration (i.e., a zero SR configuration), an additional Information Element (IE) "logicalChannelRA-Prohibit" may be appended to the LCH. This IE may have a Boolean value. For example, IE="0" means that the LCH is allowed to trigger an RA procedure to further transmit the corresponding BSR MAC CE, while IE="1" means that an LCH (e.g., the LCH with zero SR configuration) is prohibited to trigger an RA procedure even though the LCH triggers an SR procedure. Once the SR procedure for the LCH is triggered, the SR procedure becomes pending and may be cancelled only when other LCH(s) get uplink radio resources or trigger the RA procedure successfully to further transmit the BSR MAC CE. In such a case, the required uplink radio resource of the LCH may be appended to the BSR MAC CE. The Core Network (CN) and the base station may coordinate with each other to determine the setting of the IE "logicalChannelRA-Prohibit" based on the associated QoS flow for the LCH.

Figure 6:
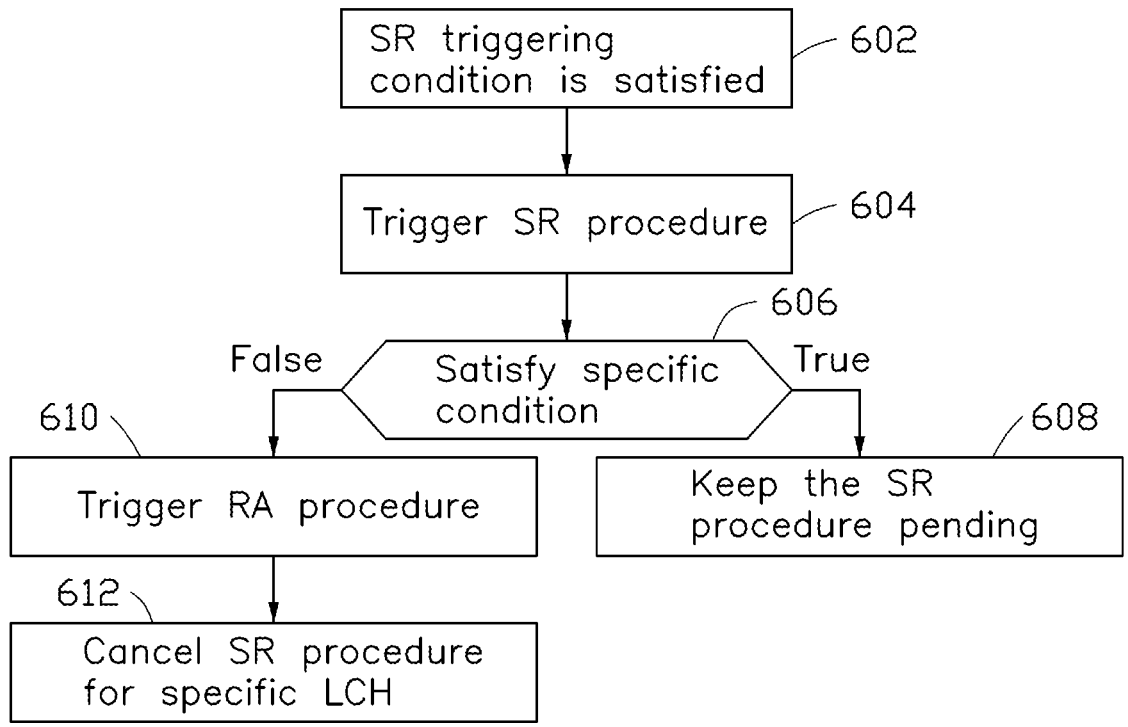
FIG. 6 is a flowchart of a method performed by a UE for SR operation, in accordance with an implementation of the present disclosure.

FIG. 6 is a flowchart of a method performed by a UE (e.g., by the UE's MAC entity) for SR operation, in accordance with an implementation of the present disclosure. In the illustrated implementation, once the UE detects that an LCH that is not configured with a valid PUCCH resource satisfies an SR triggering condition, the UE may trigger an SR procedure for the LCH. The UE may further check whether a specific condition is satisfied. If the specific condition is satisfied, the UE may perform first procedure(s) including, for example, keeping the SR procedure pending until it is canceled. If the specific condition is not satisfied, the UE may perform second procedure(s) including, for example, initiating an RA procedure and cancelling selected SR procedure(s) triggered for specific LCH(s).

As shown in FIG. 6, the flowchart includes actions 602, 604, 606, 608, 610 and 612. In action 602, the UE detects that a first LCH that is not configured with a valid PUCCH resource for SR transmission satisfies an SR triggering condition. For example, the SR triggering condition may be that a buffer status reporting procedure has failed.

In action 604, the UE triggers a first SR procedure for the first LCH.

In action 606, the UE checks whether a specific condition is satisfied. According to various implementations of the present disclosure, the specific condition may be one of the following:

1) there is no other pending SR procedure(s) triggered for the LCH(s) configured with SR configuration(s) within the same MAC entity (e.g., LCH 1 to 5 in FIG. 2);
2) there is no other pending SR procedure(s) triggered for the LCH(s) having a lower priority than the first LCH and configured with SR configuration(s) within the same MAC entity (e.g., LCH 2 in FIG. 2);
3) there is no other pending SR procedure(s) triggered for the LCH(s) having a higher priority than the first LCH and configured with SR configuration(s) within the same MAC entity (e.g., LCHs 1, 3, 4 and 5 in FIG. 2); and
4) there is no other pending SR procedure(s) triggered for the LCH(s) configured with SR configuration(s) within the same LCG (e.g., LCHs 3, 4 and 5 in FIG. 2).

In action 608, if the specific condition is satisfied, the UE may keep the first SR procedure pending.

In action 610, if the specific condition is not satisfied, the UE may trigger an RA procedure.

In action 612, the UE cancels the pending SR procedure(s) triggered for specific LCH(s). Examples of the specific LCH(s) can be the same as that described in action 408 of FIG. 4.

According to the illustrated implementation, since keeping the first SR procedure pending means that the UE does not transmit any SR to the base station for the first LCH, the uplink radio resource requirement for the first LCH may not be noticed by the base station. However, as long as any other pending SR procedure(s) are triggered for the LCH(s) configured with SR configuration(s) within the same MAC entity, the UE still has the chance to be granted the uplink radio resource even though the first LCH keeps quiet. For example, as shown in FIG. 1, once the LCH y triggers an SR procedure, the SR procedure may be kept pending because other LCH(s) 1 to x may have already triggered its (or their) SR procedure(s).

Figure 7:
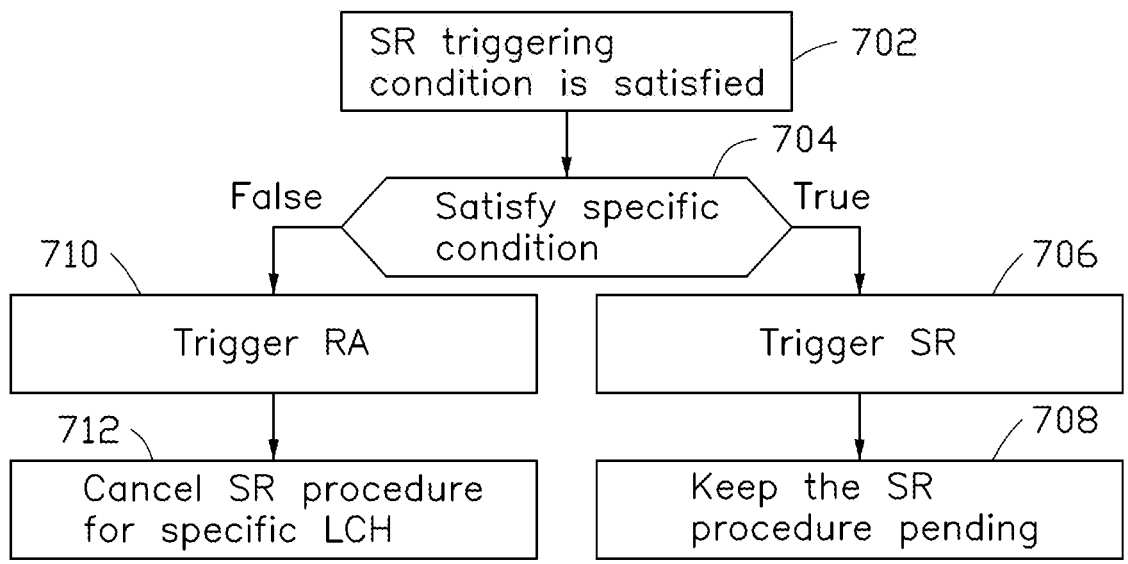
FIG. 7 is a flowchart of a method performed by a UE for SR operation, in accordance with an implementation of the present disclosure.

FIG. 7 is a flowchart of a method performed by a UE (e.g., by the UE's MAC entity) for SR operation, in accordance with an implementation of the present disclosure. In the illustrated implementation, once the UE detects that an LCH that is not configured with a valid PUCCH resource satisfies an SR triggering condition, the UE may check whether a specific condition is satisfied. If the specific condition is satisfied, the UE may perform first procedure(s) including, for example, triggering an SR procedure for the LCH and keeping the SR procedure pending until it is canceled. If the specific condition is not satisfied, the UE may perform second procedure(s) including, for example, initiating an RA procedure and cancelling selected SR procedure(s) triggered for specific LCH(s).

As shown in FIG. 7, the flowchart includes actions 702, 704, 706, 708, 710 and 712. In action 702, the UE detects that a first LCH that is not configured with a valid PUCCH resource for SR transmission satisfies an SR triggering condition. For example, the SR triggering condition may be that a buffer status reporting (BSR) procedure has failed.

In action 704, the UE checks whether a specific condition is satisfied. Action 704 may substantially be the same as (or correspond to) action 606 of FIG. 6.

In action 706, if the specific condition is satisfied, the UE may trigger a first SR procedure for the first LCH, and in action 708, keep the first SR procedure pending.

In action 710, if the specific condition is not satisfied, the UE may trigger an RA procedure, and in action 712, cancel the pending SR procedure(s) triggered for specific LCH(s). Examples of the specific LCH(s) can be the same as that described in action 408 of FIG. 4.

In one implementation, the base station (e.g., gNB) may configure an RA pending timer to a zero SR configuration LCH. The RA pending timer may be configured by the base station on a zero SR configuration LCH basis. Once the zero SR configuration LCH triggers an SR procedure and pends the SR procedure, the RA pending timer is triggered. The SR procedure may be kept pending while the RA pending timer is running. Once the RA pending timer expires, the zero SR configuration LCH may trigger an RA procedure and cancel the SR procedure(s) triggered for the specific LCH(s) as introduced in action 408 of FIG. 4, for example.

In another implementation, the RA pending timer is configured by the base station (e.g., gNB) on a per MAC entity basis. Once the zero SR configuration LCH triggers an SR procedure and pends the SR procedure, the RA pending timer will be triggered if the RA pending timer is not running yet. If the RA pending timer has been running when the SR procedure is triggered, all of the SR procedures triggered for each zero SR configuration LCH may be kept pending before the RA pending timer is expired. Once the RA pending timer expires, the UE may trigger an RA procedure and cancel the SR procedure(s) triggered for the specific LCH(s) as introduced in action 408 of FIG. 4, for example. If the UE gets uplink radio resources to transmit the BSR MAC CE for the zero SR configuration LCH, the pending SR triggered for the zero SR configuration LCH can be canceled and the RA pending timer stopped. It should be noted that the zero SR configuration LCH described above can be replaced by an LCH (e.g., the first LCH) that is not configured with a valid PUCCH resource for SR transmission.

Figure 8:
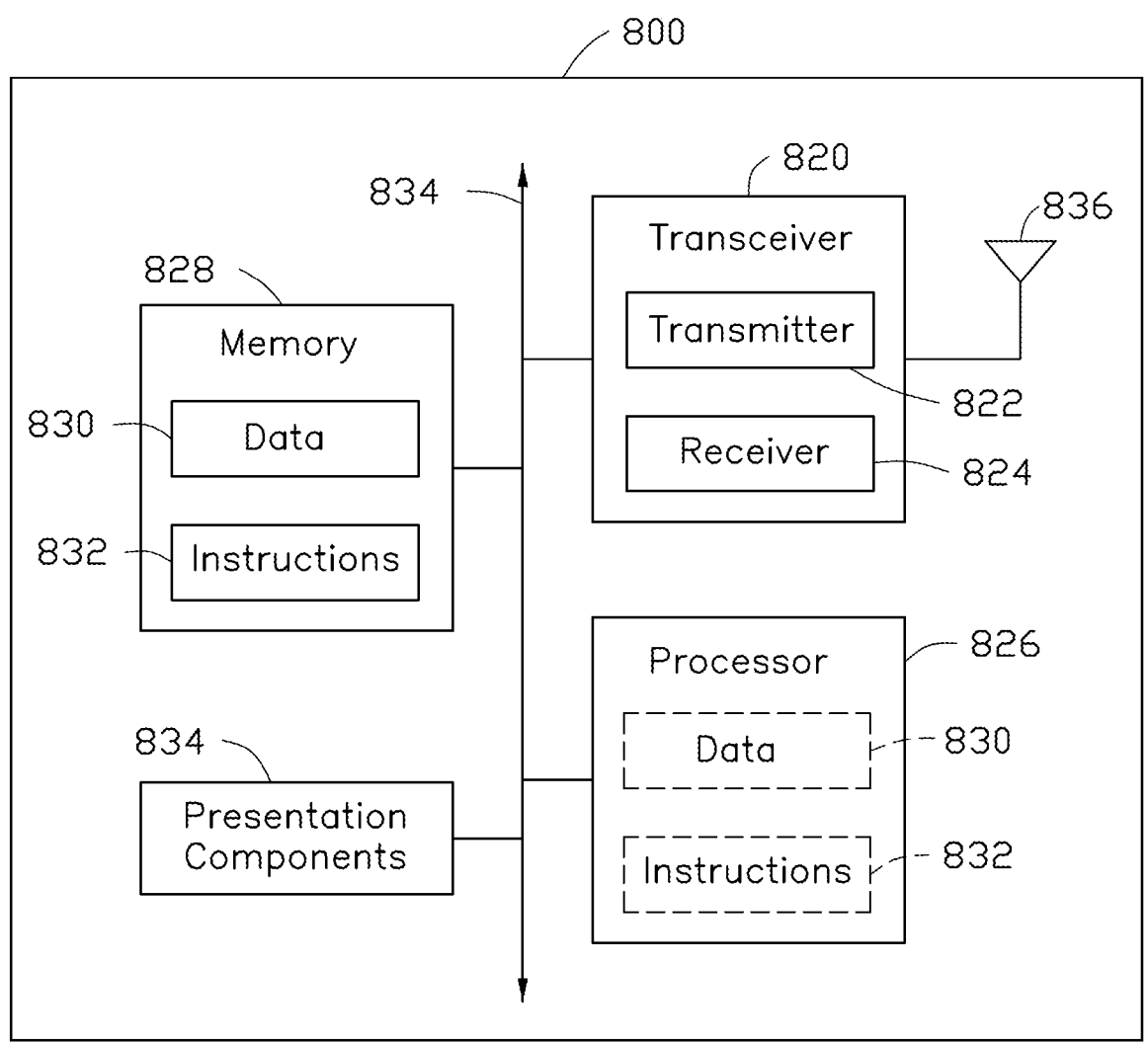
FIG. 8 illustrates a block diagram of a node for wireless communication, in accordance with various aspects of the present application.

FIG. 8 illustrates a block diagram of a node for wireless communication, in accordance with various aspects of the present application. As shown in FIG. 8, a node 800 may include a transceiver 820, a processor 826, a memory 828, one or more presentation components 834, and at least one antenna 836. The node 800 may also include an RF spectrum band module, a base station communications module, a network communications module, and a system communications management module, input/output (I/O) ports, I/O components, and a power supply (not explicitly shown in FIG. 8). Each of these components may be in communication with each other, directly or indirectly, over one or more buses 834. In one implementation, the node 800 may be a UE or a base station that performs various functions described herein, for example, with reference to FIGS. 1 through 7.

The transceiver 820 includes a transmitter 822 (e.g., transmitting/transmission circuitry) and a receiver 824 (e.g., receiving/reception circuitry), which may be configured to transmit and/or receive time and/or frequency resource partitioning information. In some implementations, the transceiver 820 may be configured to transmit in different types of subframes and slots including, but not limited to, usable, non-usable and flexibly usable subframes and slot formats. The transceiver 820 may be configured to receive data and control channels.

The node 800 may include a variety of computer-readable media. Computer-readable media can be any available media that can be accessed by the node 800 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

One or more presentation components 834 presents data indications to a person or other device. Exemplary presentation components 834 include a display device, speaker, printing component, vibrating component, and etc.

The processor 826 (e.g., having processing circuitry) may include an intelligent hardware device, e.g., a central processing unit (CPU), a microcontroller, an ASIC, and etc. (not explicitly shown in FIG. 8). The processor 826 may include memory. The processor 826 may process the data 830 and the instructions 832 received from the memory 828, and information through the transceiver 820, the base band communications module, and/or the network communications module. The processor 826 may also process information to be sent to the transceiver 820 for transmission through the antenna 836, to the network communications module for transmission to a core network.

The memory 828 may include computer-storage media in the form of volatile and/or non-volatile memory. The memory 828 may be removable, non-removable, or a combination thereof. Exemplary memory includes solid-state memory, hard drives, optical-disc drives, and etc. As illustrated in FIG. 8, The memory 828 may store computer-readable, computer-executable instructions 832 (e.g., software codes) that are configured to, when executed, cause the processor 826 to perform various functions described herein, for example, with reference to FIGS. 1 through 7. Alternatively, the instructions 832 may not be directly executable by the processor 826 but be configured to cause the node 800 (e.g., when compiled and executed) to perform various functions described herein.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a User Equipment (UE), the method comprising:
   triggering, by a Medium Access Control (MAC) entity, a first Scheduling Request (SR) procedure for a first logical channel;
   triggering, by the MAC entity, a second SR procedure for a second logical channel; and
   in response to triggering the first SR procedure,
   initiating, by the MAC entity, a Random Access (RA) procedure, and
   canceling, by the MAC entity, the first SR procedure without canceling the second SR procedure.

2. The method of claim 1, wherein the first logical channel is not mapped to any SR configuration received by the UE from a base station through a downlink Radio Resource Control (RRC) message.

3. The method of claim 1, wherein the first logical channel is not configured with a valid Physical Uplink Control Channel (PUCCH) resource for the first SR procedure on an active Bandwidth Part (BWP).

4. A User Equipment (UE) comprising:
   one or more non-transitory computer-readable media having computer-executable instructions embodied thereon; and
   at least one processor coupled to the one or more non-transitory computer-readable media, and configured to execute the computer-executable instructions to:
   trigger a first Scheduling Request (SR) procedure for a first logical channel;
   trigger a second SR procedure for a second logical channel; and
   in response to triggering the first SR procedure,
   initiate a Random Access (RA) procedure, and
   cancel the first SR procedure without canceling the second SR procedure.

5. The UE of claim 4, wherein the first logical channel is not mapped to any SR configuration received by the UE from a base station through a downlink Radio Resource Control (RRC) message.

6. The UE of claim 4, wherein the first logical channel is not configured with a valid Physical Uplink Control Channel (PUCCH) resource for the first SR procedure on an active Bandwidth Part (BWP).

* * * * *